Sept. 1, 1964  G. H. DRUTCHAS  3,146,719
COMBINATION PUMP AND FLOW REGULATOR
Filed Sept. 17, 1959
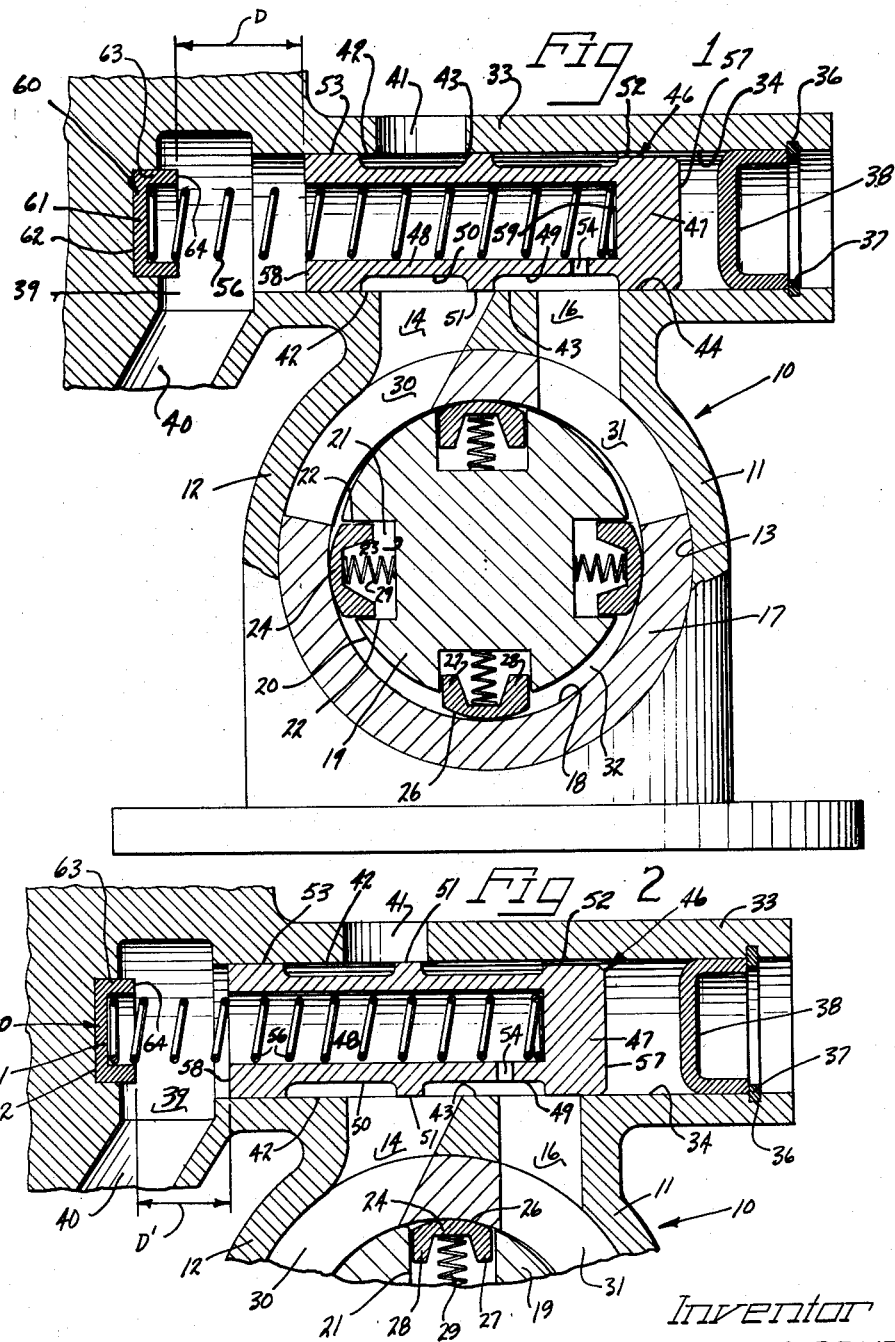
Inventor
GILBERT H. DRUTCHAS
by Hill Sherman Meroni Gross & Simpson
Attys.

United States Patent Office 3,146,719
Patented Sept. 1, 1964

3,146,719
COMBINATION PUMP AND FLOW REGULATOR
Gilbert H. Drutchas, Detroit, Mich., assignor to Thompson Ramo Wooldridge, Inc., Cleveland, Ohio, a corporation of Ohio
Filed Sept. 17, 1959, Ser. No. 840,703
11 Claims. (Cl. 103—42)

This invention relates generally to hydraulic systems and more particularly relates to a combination pump and flow regulator wherein a flow regulating valve normally positioned as a function of pump speed is additionally biased as a function of valve position, thereby accomplishing a desired flow reduction at increased pump-operating speeds.

In power assisting systems such as a power steering system for an automotive vehicle, it is desirable to reduce the flow of hydraulic fluid in the system at high operating speeds, at which time the steering effort is small and the heat rise due to excessive flow of the pumping medium being worked upon is high.

In the prior art arrangements, combination pumps and flow regulators are provided wherein discharge flow is regulated as a function of pump speed through the utilization of a flow orifice. Thus, the pressure differential on opposite sides of the flow orifice is measured by appropriate motive surfaces on the regulator valve and constant flow conditions are effected.

To further improve the operating conditions, it is contemplated by the present invention that the biasing force acting upon the flow regulator valve will be a function of the valve displacement as well as of the pump speed. By making such provision, the back pressure on the pump at higher operating speeds where turning effort is small, and the heat rise due to excessive flow work is high will be reduced.

In the illustrated form of the invention the flow of fluid from a pump outlet through a flow control valve orifice creates a pressure differential on opposite sides of the orifice proportional to the flow rate. Thus, as pump speed increases, the amount of excess discharge also increases moving the linearly positionable spool valve as a function of pump speed to by-pass excess pump discharge. A permanent magnet is positioned in spaced relation to the valve and is preferably intersected by the valve axis so that the magnet will exert an additional biasing force on the valve which is a function of the valve position, the coercive force exerted by the magnet on the valve being proportional to the square of the spacing dimension between the magnet and the valve. By virtue of such provision, the flow of fluid at high speed is reduced, thereby reducing the flow of fluid through the system at a time when the steering effort is small and when heat rise due to excessive flow is high.

It is an object of the present invention, therefore, to provide improved methods and apparatus for flow regulation in an hydraulic system.

Another object of the present invention is to provide a method and apparatus for controlling flow wherein a linearly movable spool valve which is normally flow responsive is additionally biased as a function of valve position.

A further object of the present invention is to provide flow regulating means using magnetic means to increase the opening bias on the valve in proportion to the linear displacement of the valve.

Another object of the present invention is to provide a permanent magnet for exerting a biasing force on a spool valve as a function of valve position.

Many other features, advantages and additional objects of the present invention will become manifest to those versed in the art upon making reference to the detailed description which follows and the accompanying sheet of drawings in which a preferred structural embodiment of a combined pump and flow regulator is shown by way of illustrative example.

On the drawings:
FIGURE 1 is a cross-sectional view with parts shown in elevation of a combined pump and flow regulator embodying the principles of the present invention.
FIGURE 2 is a fragmentary view similar to FIGURE 1 and showing the flow regulator in an adjusted position.

As shown on the drawings:
An integral combined pump and flow regulator is indicated generally at 10 and includes a casing 11 forming a pump housing 12 having a pumping chamber 13 formed with an inlet 14 and an outlet 16.

Received within the pumping chamber 13 is a liner 17 having formed therein a bore 18. Rotatable within the liner 17 is a rotor 19 formed with a peripheral surface 20 characterized by one or more axially extending notches or recesses 21 each having side walls 22, 22 and a bottom wall 23, thereby to receive for rocking and reciprocatory movement therein a slipper member 24.

Each slipper member 24 may comprise a generally U-shaped member having a bight portion providing a contact surface 26 which engages and follows the wall of the bore 18 in the liner 17 and further including side leg portions 27 and 28, respectively, which are adapted to be positioned adjacent the walls 22, 22 of the notches or recesses 21.

A continuous biasing means taking the form of a coil spring 29 is bottomed at one end against the wall 23 in each respective recess 21 and is bottomed at the opposite end against the bight portion of the slipper member 24, thereby to normally preload and continuously bias the slipper member outwardly into contact with the bore wall 18.

The liner 18 is formed with an inlet opening 30 and an outlet opening 31, both openings being in register, respectively, with the pump inlet 14 and the pump outlet 16.

The liner bore 18 together with the rotor 19 forms a working chamber 32 which is preferably crescent-shaped, for example, by eccentrically offsetting the bore 18 and the rotational axis of the rotor 19 with respect to one another. Accordingly, upon rotation of the rotor, the space between an adjoining set of slipper members 24, 24 will be expanding on the inlet side of the pump, thereby to fill such space with fluid from the inlet 14 through the inlet opening 30 and the fluid will be discharged under increased pressure through the outlet opening 31 and into the pump outlet 16.

In accordance with the principles of the present invention, the fluid flow is regulated by a flow regulator contained within an enlarged boss 33 formed on the upper part of the casing 11. In the illustrative embodiment herein disclosed by way of example, it is contemplated that the combination pump and flow regulator is incorporated into an hydraulic circuit of a power assisting device such as the steering system of an automotive vehicle. Thus, the pump operates to drive a stream of pressurized fluid through the circuit for use at a point of utilization which consists of a power assisting device such as the power steering unit.

As shown in FIGURES 1 and 2, the boss 33 has a bore 34 formed therein. A peripheral groove 36 is formed near one end of the bore 34 and receives a snap ring 37, thereby to position and retain a closure cap 38 closing one end of the bore 34.

At the opposite end of the bore 34 there is provided an enlarged discharge recess 39 having an appropriate conduit connection 40 to which may be attached a conduit leading to the point of utilization.

The boss 33 is further provided with an inlet opening 41 in circumferential alignment with the inlet 14. On opposite sides of the inlet opening 41 and the pump inlet 14 there is formed by the walls of the bore 34 control lands indicated at 42 and 43, respectively, the bore 34 providing additional control lands indicated at 44 on the opposite side of the outlet 16.

Furthermore, a spool valve member indicated generally at 46 is movable for linear adjustment on a valve axis extending through the bore 34. The spool valve member 46 includes a head portion 47 and axially extending walls 48 formed with a pair of circumferential recesses 49 and 50 separated by a valve land 51 and including additional valve lands shown at 52 and 53 at opposite ends for cooperating with the lands 42, 43, 44 and for thereby effecting a valve control action upon linear adjustment of the spool valve 46 in the bore 34.

The walls 48 of the spool valve member 47 are formed with an orifice 54 interconnecting the hollow center portion of the spool valve 46 and the recess 49 in register with the outlet 16 and through which fluid discharged by the pump flows to the outlet 39, 40.

In order to preload the spool valve 46 for control purposes, there is provided a continuous biasing means taking the form of a coil spring 56 one end of which is bottomed against the head portion 47 of the spool valve 46 and the other end of which operatively engages the casing 11, thereby to bias the spool valve towards a normally closed position wherein all flow discharged by the pump is directed through the orifice 54.

It will be understood that fluid flow from the pump outlet 16 through the flow control valve orifice 54 creates a pressure differential on opposite sides of the orifice 54. Thus, the land 52 may be relieved so that pump outlet pressure will be communicated to the rear surface of the valve and will act on the rear motive surface shown at 57. When a higher pressure acting on the surface 57 urges the flow control valve 46 to the left in opposition to the summation of the forces exerted by the coil spring 56 and the lower pressure acting on the end face 58 and on the bottom wall 59, the valve 46 will be moved towards the position illustrated in FIGURE 2 wherein the recess 49 interconnects the pump outlet 16 directly with the pump inlet 14, thereby directly by-passing excess pump discharge to the pump inlet to maintain a constant flow in the line 40. As pump speed increases, the amount of such excess discharge also increases, thereby requiring the valve 46 to move further to the left. Thus, such linear adjustment as effected by virtue of the pressure differential on opposite sides of the orifice 54 is a function of pump speed or, in terms of the actual variable controlling such adjustment, a function of the pressure differential on opposite sides of the flow orifice 54.

In accordance with the principles of the present invention, an additional biasing force is introduced to act upon the valve 46 which biasing force is a function of valve position.

In accordance with the preferred embodiment herein illustrated by way of example, a permanent magnet 60 is provided. The magnet 60 may conveniently comprise a cup-shaped member having a bottom wall 61 seated within a recess 62 formed in the casing 11 at the end of the bore 34 and having side walls 63 terminating in a front face 64. The front face 64 of the magnet 60 is spaced from the end face 58 of the spool valve 46 by a dimension indicated in FIGURE 1 at D. The magnet 60 is constructed and arranged to establish a magnetic field in the bore 34 and which field is intersected by the axis of the bore 34 so that the magnetic lines of force extend in the direction of the spool valve 46. Moreover, it is contemplated, in accordance with the principles of the present invention, that the spool valve 46 be made of a material capable of being magnetized so that the magnet 60 will exert an additional biasing force on the valve.

It will be noted upon comparing FIGURES 1 and 2 that as the valve 46 moves towards a further open position, the spacing dimension D is reduced so that the spacing dimension in FIGURE 2 is indicated at D'. Accordingly, the magnetic force exerted by the permanent magnet 60, with reference to the spool valve 46, is proportional to the square of the distance D. As the valve 46 is moved towards the magnet 60, the biasing force exerted on the valve 46 will be increased proportional to the amount of linear adjustment or valve displacement.

By virtue of the cup-shaped configuration of the magnet 60, the magnet 60 is conveniently employed in the illustrated embodiment to seat the other end of the coil spring 56.

In operation, therefore, even though the valve position is normally a function of pump speed, or of the pressure differential on opposite sides of the flow orifice 54, by the use of the permanent magnet 60, an additional biasing force is introduced which is a function of the linear adjustment or valve position, thereby accomplishing a desired flow reduction at high speed. In other words, by placing the permanent magnet in the assembly, it attracts the valve 46 and because such attraction is proportional to the square of the distance D, the biasing force is then a function of valve position.

Such provision is particularly desirable in a power steering system since it is desirable to reduce the flow of hydraulic fluid in the system at high speed, at which time the steering effort is small and the heat rise due to excessive flow work is high.

Although minor modifications might be suggested by those versed in the art, it should be understood that I wish to embody within the scope of the patent warranted hereon all such modifications as reasonably and properly come within the scope of my contribution to the art.

I claim as my invention:

1. In a pump for an automotive power assisting system comprising a housing having an inlet and an outlet and a pumping chamber therebetween, a rotor in said housing having a peripherally notched surface, slipper means carried by said rotor in said peripherally notched surface, said slipper means being free to rock and to reciprocate in the notched portion of the rotor in following the contour of an adjoining bore wall provided by the pumping chamber, the improvement of a linearly movable spool valve in said pump outlet having an orifice formed therein through which fluid is discharged under pressure by said pump, biasing means to load the valve closed, said spool valve having lands and recesses formed to open the valve against the biasing means to by-pass excess pump discharge to said pump inlet as a function of pump speed, and means additionally opening said spool valve as a function of the linear displacement of said valve in said pump outlet, thereby reducing back pressure on the pump at higher operating speeds when demand is small.

2. A pump as defined in claim 1, said biasing means comprising a permanent magnet carried in said housing and spaced from said spool valve to exert said additional biasing force through magnetic coercion, said spool valve being made of a material capable of being magnetized.

3. In a pump comprising a housing having an inlet and an outlet with a pumping chamber therebetween and with rotary fluid displacement means in said pumping chamber to move fluid from said inlet to said outlet at increased pressure, the improvement of a linearly movable spool valve in said outlet having an orifice formed therein through which fluid is discharged and bypassing excess pump discharge to said inlet as a function of pump speed, primary biasing means to normally bias the valve closed, and force-applying means additionally applying opening forces against said spool valve as a function of the linear displacement of the valve.

4. In a power steering system, a flow regulator comprising a linearly movable spool valve having an orifice formed therein through which fluid is directed, said valve having motive surfaces subject to the pressure differential across said orifice whereby the valve will be adjustably positioned linearly as a function of the flow rate thereby to bypass excess fluid, primary biasing means tending to close said valve, and means acting on said spool valve to increase the opening force acting on said spool valve as a function of valve position.

5. A flow regulator comprising
   means forming a valve chamber having axially spaced lands and openings forming first and second flow paths,
   a spool valve linearly movable in said valve chamber,
   continuous biasing means loading said valve in one direction,
      said spool valve having an orifice formed therein through which fluid flows in said first flow path,
         the flow in said second flow path being controlled by the pressure drop in said orifice in said first flow path,
   motive surfaces on said spool valve subject to the pressures on opposite sides of said orifice to adjust said spool valve linearly against said bias as a function of the pressure drop across said orifice,
      said spool valve being made of material capable of being magnetized, and
   means establishing a magnetic field in said valve chamber biasing said spool valve open as a function of its linear displacement in said chamber.

6. A flow regulator comprising
   means forming a valve chamber having axially spaced lands and openings forming first and second flow paths,
   a spool valve linearly movable in said valve chamber,
   continuous biasing means loading said valve in one direction,
      said spool valve having an orifice formed therein through which fluid flows in said first flow path,
      the flow in said second flow path being controlled by the pressure drop in said orifice in said first flow path,
   motive surfaces on said spool valve subject to the pressures on opposite sides of said orifice to adjust said spool valve linearly against said bias as a function of the pressure drop across said orifice,
      said spool valve being made of material capable of being magnetized,
   and a permanent magnet in said valve chamber additionally opening said spool valve as a function of its linear displacement.

7. In a flow regulator,
   a spring-biased linearly movable spool valve having an orifice formed therein through which is directed flow in a first flow path and the pressure drop across which controls the flow in a second flow path,
      said spool valve being adjustably positioned to open position against the spring bias as a function of the pressure drop across said orifice,
      said spool valve being made of a material capable of being magnetized and
      means establishing a magnetic field to additionally open said spool valve as a function of its adjusted position.

8. In a flow regulator,
   a spring biased linearly movable spool valve having an orifice formed therein through which is directed flow in a first flow path and the pressure drop across which controls the flow in a second flow path,
      said spool valve being adjustably positioned to open position against the spring bias as a function of the pressure drop across said orifice,
      said spool valve being made of a material capable of being magnetized and a permanent magnet spaced from said spool valve and additionally opening said spool valve as a function of its adjusted position.

9. The method of controlling flow in a first flow path with a flow responsive linearly movable spool valve having an orifice formed therein situated in a second flow path which includes the steps of
   continuously biasing the valve in one direction,
   opening the valve selectively against the bias as a function of a pressure drop across said orifice in said second flow path, and
   applying additional opening forces to the valve in opposition to said continuous bias as a function of valve position.

10. A flow regulator comprising
    means forming a valve chamber having axially spaced lands and openings forming first and second flow paths,
    a spool valve linearly movable in said valve chamber to control the flow of fluid in said second flow path,
    control biasing means biasing said valve closed,
       said spool having an orifice formed therein situated in said first flow path and subject to a pressure differential thereacross,
    motive surfaces on said spool valve subject to pressures on opposite sides of said orifice to adjust said spool valve linearly against said bias as a function of the pressure differential, and
    means additionally biasing said spool valve open as a function of its linear displacement in said chamber.

11. The method of controlling a pressurized fluid stream in a second flow path with a flow responsive linearly movable spring-biased spool valve including the steps of
    opening the valve against the spring bias as a function of a pressure differential on opposite sides of a flow orifice in a first flow path thereby controlling the flow in said second flow path as a function of flow in said first flow path, and
    additionally opening the valve as a function of the linear displacement of the valve.

References Cited in the file of this patent

UNITED STATES PATENTS

| | | |
|---|---|---|
| 996,125 | Pagel | June 27, 1911 |
| 1,875,511 | Shivers | Sept. 6, 1932 |
| 1,934,548 | Kellogg | Nov. 7, 1933 |
| 1,965,526 | Willson | July 3, 1934 |
| 2,141,022 | Rotter | Dec. 20, 1938 |
| 2,231,158 | Davis | Feb. 11, 1941 |
| 2,493,297 | Landon | Jan. 3, 1950 |
| 2,588,674 | Van Denberg et al. | Mar. 11, 1952 |
| 2,669,249 | Wittmann | Feb. 16, 1954 |
| 2,700,395 | Young | Jan. 25, 1955 |
| 2,887,060 | Adams et al. | May 19, 1959 |
| 2,888,037 | Jones et al. | May 26, 1959 |
| 2,977,888 | Livermore | Apr. 4, 1961 |
| 2,991,805 | Page | July 11, 1961 |

FOREIGN PATENTS

| | | |
|---|---|---|
| 489,763 | Italy | Jan. 26, 1954 |